United States Patent Office 2,992,219
Patented July 11, 1961

2,992,219
PHOSPHOROTHIOLOTHIONATES DERIVED FROM 5,6-DIHYDRO-4H-1,3-OXAZINES AND 5,6-DIHYDRO-4H-1,3-THIAZINES
Richard L. McConnell and Harry W. Coover, Jr., Kingsport, Tenn., assignors to Eastman Kodak Company, Rochester, N.Y., a corporation of New Jersey
No Drawing. Filed Sept. 19, 1958, Ser. No. 761,967
6 Claims. (Cl. 260—243)

This invention relates to new organophosphorus compounds and to their method of preparation. In a specific aspect this invention relates to the preparation of new organophosphorus compounds by the reaction of dialkyl phosphorothiolothionates with derivatives of 5,6-dihydro-4H-1,3-oxazine or 5,6-dihydro-4H-1,3-thiazine and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention it has been found that new organophosphorus compounds, useful as insecticides, can be prepared by reacting dialkyl phosphorothiolothionates with a 5,6-dihydro-2-vinyl-4H-1,3-oxazine or a 5,6-dihydro-2-isopropenyl-4H-1,3-oxazine or the corresponding sulfur analogs. The new products of this invention have the structural formulas:

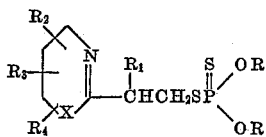

wherein X is selected from the group consisting of oxygen and sulfur, R is a lower alkyl radical containing 1 to 4 carbon atoms, $R_1$ is selected from the group consisting of hydrogen and methyl, and $R_2$, $R_3$ and $R_4$ are selected from the group consisting of hydrogen, alkyl radicals containing 1 to 4 carbon atoms and haloalkyl radicals containing 1 to 4 carbon atoms.

In preparing the products of this invention, dialkyl phosphorothiolothionates having the following structural formula are used:

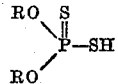

wherein R is a lower alkyl radical containing from 1 to 4 carbon atoms. The oxazine and thiazine derivatives that are used in preparing the compounds of this invention have the structural formulas:

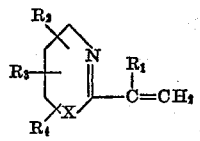

wherein X, $R_1$, $R_2$, $R_3$ and $R_4$ are as defined above in the structural formula for the products of this invention. These oxazines and thiazines may be prepared by the reaction of acrylonitrile or methacrylonitrile with the appropriate 1,3-glycol or 1,3-dithiol in the presence of sulfuric acid.

In the practice of this invention we prefer to add one of the reactants gradually to a reactor containing the other reactant. For example, the oxazine derivative can be added gradually to a reactor containing the dialkylphosphorothiolothionate. Alternatively however, the reverse procedure of addition of reactants can be used and the dialkylphosphorothiolothionate can be added to a reactor containing the oxazine derivative. Normally it is desirable to employ a reactor provided with adequate means of agitation and, since the reaction is quite exothermic, it is also desirable to employ a reactor that is provided with adequate cooling means.

The operable temperature range for the reaction is generally from −25 to 150° C. and the preferred temperature range is from 25 to 100° C. However, it will be realized that in some instances temperatures outside this range can be employed. The reaction time usually varies from ½ to 8 hours, but longer and shorter reaction periods are sometimes used. Normally it is unnecessary to employ a catalyst for the reaction since the dialkyl phosphorothiolothionate will react with these oxazine derivatives in the absence of a catalyst. If it is considered desirable to employ a catalyst, there are certain catalysts that can be used, for example, the tertiary amines, such as triethyl amine, and the like.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants. However, it is within the scope of our invention to use any molar ratio of reactants.

The following examples are illustrative of the compounds within the scope of this invention, their method of preparation and their utility as insecticides.

Example 1.—*O,O-diethyl S-[2-(5,6-dihydro-4,4,6-trimethyl-4H-1,3-oxazin-2-yl)ethyl] phosphorothiolothionate*

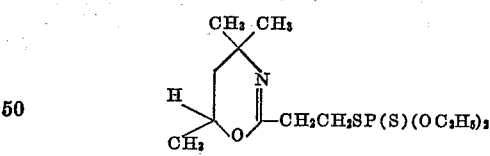

Diethyl phosphorothiolothionate (0.1 mole) was placed in a flask and stirred while 5,6-dihydro-4,4,6-trimethyl-2-vinyl-4H-1,3-oxazine (0.1 mole) was added dropwise with stirring. The reaction is exothermic, and the temperature was moderated by the rate of addition of the oxazine. The maximum temperature allowed during the reaction was 80° C. The reaction mixture was stirred until it had cooled to 25° C. The product was an extremely viscous yellow oil which is soluble in acetone.

The reaction was repeated, but the order of addition was reversed. The product obtained was similar to that obtained above.

Example 2.—*O,O-diethyl S-[2-(5,6-dihydro-5,5-dimethyl-4H-1,3-oxazin-2-yl)ethyl] phosphorothiolothionate*

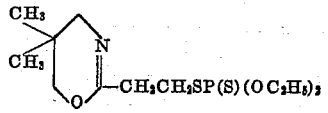

This viscous transparent oil was prepared from diethyl phosphorothiolothionate (0.1 mole) and 5,6-dihydro-5,5-dimethyl-2-vinyl-4H-1,3-oxazine (0.1 mole) according to the procedure of Example 1.

*Example 3.—O,O-diethyl S-[2-(5,6-dihydro-4,4,6-trimethyl-4H-1,3-oxazin-2-yl)-2-methylethyl] phosphorothiolothionate*

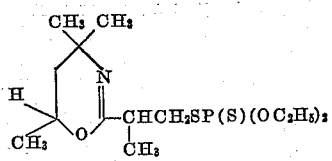

This light yellow, viscous oil was prepared from diethyl phosphorothiolothionate (0.06 mole) and 5,6-dihydro-4,4,6-trimethyl-2-isopropenyl-4H-1,3-oxazine (0.06 mole) according to the procedure of Example 1, except that the maximum temperature allowed during the reaction was 56° C., $n_D^{20}$ 1.5210. It was soluble in acetone.

*Example 4.—O,O-dimethyl S-[2-(5,6-dihydro-4H-1,3-oxazin-2-yl)ethyl] phosphorothiolothionate*

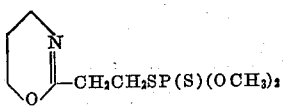

This viscous yellow oil was prepared from dimethyl phosphorothiolothionate (0.1 mole) and 5,6-dihydro-2-vinyl-4H-1,3-oxazine (0.1 mole) according to the procedure of Example 1.

*Example 5.—O,O-diisopropyl S-[2-(5,6-dihydro-4-isopropyl-5,5-dimethyl-4H-1,3-oxazin-2-yl)-2-methylethyl] phosphorothiolothionate*

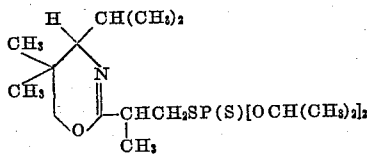

This viscous transparent oil was obtained from diisopropyl phosphorothiolothionate (0.1 mole) and 5,6-dihydro-4-isopropyl-5,5-dimethyl-2-isopropenyl-4H-1,3-oxazine (0.1 mole) according to the procedure of Example 1.

*Example 6.—O,O-diethyl S-{2-[5,5-bis(chloromethyl)-5,6-dihydro-4H-1,3-oxazin-2-yl]ethyl} phosphorothiolothionate*

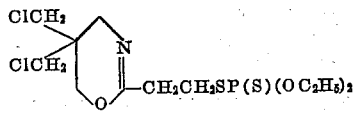

This viscous yellow oil was obtained from diethyl phosphorothiolothionate (0.1 mole) and 5,5-bis(chloromethyl)-5,6-dihydro-2-vinyl-4H-1,3-oxazine (0.1 mole) according to the procedure of Example 1.

Similar results were obtained using 5,5-bis(chloromethyl)-5,6-dihydro-2-isopropenyl-4H-1,3-oxazine.

*Example 7.—O-ethyl O-methyl S-{2-[5,5-bis(bromomethyl)-5,6-dihydro-4H-1,3-oxazin-2-yl]ethyl} phosphorothiolothionate*

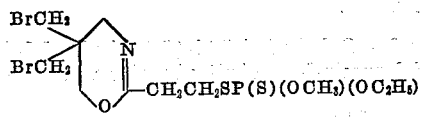

This viscous oil was obtained from O-ethyl O-methyl phosphorothiolothionate (0.1 mole) and 5,5-bis(bromomethyl)-5,6-dihydro-2-vinyl-4H-1,3-oxazine (0.1 mole) according to the procedure of Example 1.

Similar results were obtained using 5,5-bis(bromomethyl)-5,6-dihydro-2-isopropenyl-4H-1,3-oxazine.

*Example 8.—O,O-diethyl S-[2-(5,6-dihydro-4,4,6-trimethyl-4H-1,3-thiazin-2-yl)ethyl] phosporothiolothionate*

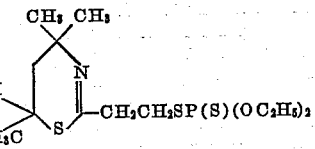

This viscous yellow oil was prepared from diethyl phosphorothiolothionate (0.1 mole) and 5,6-dihydro-4,4,6-trimethyl-2-vinyl-4H-1,3-thiazine (0.1 mole) according to the procedure of Example 1.

*Example 9.—O,O-dimethyl S-[2-(5,6-dihydro-5,5-dimethyl-4H-1,3-thiazin-2-yl)-2-methylethyl] phosphorothiolothionate*

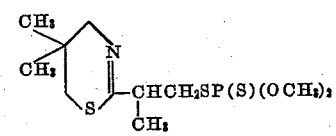

This compound was prepared from dimethyl phosphorothiolothionate (0.1 mole) and 5,6-dihydro-5,5-dimethyl-2-isopropenyl-4H-1,3-thiazine (0.1 mole) according to the procedure of Example 1.

*Example 10.—Use of compounds as insecticides*

Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solution and dried in a gentle air stream. The leaves were then placed on damp paper toweling in Petri dishes and observed after 24 hours for mortality among the adult mites.

It should be noted that tests using acetone-water solutions (containing none of the toxicant) kill none of the mites.

| Toxicant | Concentration in p.p.m. | Percent Kill Mites |
|---|---|---|
| 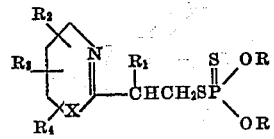 | 100 | 100 |

The compounds prepared in Examples 2 through 9 were similarly effective when tested in the above manner.

This invention has been described in detail with particular reference to preferred embodiments thereof, but it will be understood that variations and modifications can be effected within the spirit and scope of the invention as described above and as defined in the appended claims.

We claim:

1. An organophosphorus compound of the formula:

$$\begin{array}{c}R_2\\R_1\underset{R_4}{\overset{N}{\diagup}}\underset{X}{\overset{R_1}{\diagdown}}CHCH_2\overset{S}{\underset{\|}{P}}\diagup\overset{OR}{\diagdown}_{OR}\end{array}$$

wherein X is selected from the group consisting of oxygen and sulfur, R is a lower alkyl radical, $R_1$ is selected from the group consisting of hydrogen and methyl, and $R_2$, $R_3$ and $R_4$ are selected from the group consisting of hydrogen, lower alkyl and lower haloalkyl containing a single halogen atom attached to the terminal carbon atom and selected from the group consisting of chlorine and bromine.

2. O,O-diethyl S-[2-(5,6-dihydro-4,4,6-trimethyl-4H-1,3-oxazin-2-yl)ethyl] phosphorothiolothionate.

3. O,O-diethyl S-[2-(5,6-dihydro-5,5-dimethyl-4H-1,3-oxazin-2-yl)ethyl] phosphorothiolothionate.

4. O,O-diethyl S-[2-(5,6-dihydro-4,4,6-trimethyl-4H-1,3-oxazin-2-yl)-2-methylethyl] phosphorothiolothionate.

5. O,O-dimethyl S-[2-(5,6-dihydro-5,5-dimethyl-4H-1,3-thiazin-2-yl)-2-methylethyl] phosphorothiolothionate.

6. O,O-diethyl S-{2-[5,5-bis(chloromethyl)-5,6-dihydro-4H-1,3-oxazin-2-yl]ethyl} phosphorothiolothionate.

References Cited in the file of this patent

UNITED STATES PATENTS

| | | |
|---|---|---|
| 2,729,675 | Cowen | Jan. 3, 1956 |
| 2,736,726 | Gaetzi et al. | Feb. 28, 1956 |
| 2,794,041 | Norman | May 28, 1957 |
| 2,831,858 | De Benneville | Apr. 22, 1958 |
| 2,852,514 | Schrader | Sept. 16, 1958 |
| 2,862,017 | Schrader | Nov. 25, 1958 |
| 2,876,156 | Baveley | Mar. 3, 1959 |
| 2,877,155 | Metivier | Mar. 10, 1959 |